United States Patent
Mochizuki

Patent Number: 6,091,676
Date of Patent: Jul. 18, 2000

[54] AUTOMATIC DISC CHANGER FOR A DISC REPRODUCING SYSTEM WITH TIME DELAY

[75] Inventor: Keisuke Mochizuki, Saitama-ken, Japan

[73] Assignee: Pioneer Electronic Corporation, Tokyo, Japan

[21] Appl. No.: 08/891,982

[22] Filed: Jul. 11, 1997

Related U.S. Application Data

[63] Continuation of application No. 08/507,666, Jul. 25, 1995, abandoned.

[30] Foreign Application Priority Data

Aug. 4, 1994 [JP] Japan .................................. 6-183587

[51] Int. Cl.[7] ............................................... G11B 19/06
[52] U.S. Cl. ........................................................ 369/34
[58] Field of Search .............................. 369/36, 38, 192, 369/32, 54, 34, 178; 360/92

[56] References Cited

U.S. PATENT DOCUMENTS

| | | | |
|---|---|---|---|
| 4,358,842 | 11/1982 | Kimura | 369/247 |
| 4,580,254 | 4/1986 | Hojyo et al. | 369/39 |
| 4,594,700 | 6/1986 | Takahashi et al. | 369/39 |
| 4,599,716 | 7/1986 | Shimbo | 369/39 |
| 4,851,938 | 7/1989 | Inami | 360/96.5 |
| 4,860,133 | 8/1989 | Baranski | 360/92 |
| 4,967,293 | 10/1990 | Aruga et al. | 369/247 |
| 5,006,940 | 4/1991 | Hamachi et al. | 369/34 |
| 5,062,099 | 10/1991 | Odawara et al. | 369/247 |
| 5,105,317 | 4/1992 | Sugiyama et al. | 360/96.5 |
| 5,243,475 | 9/1993 | Odashima et al. | 360/99.07 |
| 5,303,214 | 4/1994 | Kulakowski et al. | 369/34 |
| 5,337,297 | 8/1994 | Kvifte et al. | 360/92 |
| 5,353,269 | 10/1994 | Kobayashi et al. | 369/192 |
| 5,416,650 | 5/1995 | Otonomiya et al. | 360/96.5 |
| 5,502,697 | 3/1996 | Taki | 369/38 |

FOREIGN PATENT DOCUMENTS

| | | | |
|---|---|---|---|
| 6-28786 | 2/1994 | Japan | 369/54 |
| 6-44672 | 2/1994 | Japan | 369/54 |
| 6-68491 | 3/1994 | Japan | 369/54 |

*Primary Examiner*—Brian E. Miller
*Attorney, Agent, or Firm*—Nikaido, Marmelstein, Murray & Oram, LLP

[57] ABSTRACT

An automatic disc changer has a casing for the automatic disc changer, and a plurality of disc holders arranged in the casing. The disc holder stores a plurality of discs in vertical position. A reproducing device is provided in the casing to be moved along the disc holder. A detector is provided for detecting completion of change of a disc. In response to the detection, the reproducing device is stopped for a predetermined time.

11 Claims, 8 Drawing Sheets

AUTOMATIC DISC CHANGER FOR A DISC REPRODUCING SYSTEM WITH TIME DELAY

This application is a continuation of application Ser. No. 08/507,666 filed Jul. 25, 1995, now abandoned.

BACKGROUND OF THE INVENTION

The present invention relates to an automatic disc changer system for a disc reproducing system, and more particularly to a control system for controlling a reproducing device of the automatic disc changer system.

Japanese Patent Application Laid-open 60-138769 discloses an automatic disc changer system, whereby it is possible to store a large number of discs in a small space in the system, to change a disc at a high speed, and to meet requests for a simple structure with an accurate operation.

The system comprises a casing having a pair of tray holders secured thereto. A disc tray on which a plurality of discs are mounted in the vertical disposition is detachably mounted between the holders. A pair of pulleys are rotatably mounted on opposite side plates of the casing. A wire is provided between the pulleys for preventing the discs stored in the tray from being removing from the tray. An end of the wire is secured to a side of a disc reproducing device. The other end of the wire is secured to an opposite side of the reproducing device. The reproducing device is movable in the directions along the discs between the side plates. The device has a disc loading device provided on a front portion thereof so as to pick up a selected disc from the tray and load the disc in the device through an opening.

In the system, the wire is secured to the device and extended over the disc tray so that the disc which is accidentally removed from the tray caused by vibration is prevented from being removed.

However, since the wire has a predetermined length and secured to the reproducing device, it is impossible to provide a plurality of reproducing devices in the casing, because the reproducing devices are connected with each other by the wire and each reproducing device can not be independently moved in order to reproduce a desired disc.

The disc tray has a plurality of curved holding plates so as to form spaces therebetween for storing the discs. The holding plate has a tapered upper end. When a selected disc is to be loaded in the reproducing device, a loading arm rotatably mounted in the loading device is inserted into the space between the holding plates. A loading end of the loading arm is engaged with the disc so that the disc is removed from the tray by returning the loading arm.

In such a structure, it is necessary to accurately position the end of the loading arm corresponding to the disc in the space and the tapered end of the holding plate.

If the loading end is deflected, the end may be inserted into an adjacent space of the selected disc, causing troubles of the operation.

In order to eliminate the above described disadvantages, the applicant has proposed an automatic disc changer system having a plurality of reproducing devices.

Figure 1:
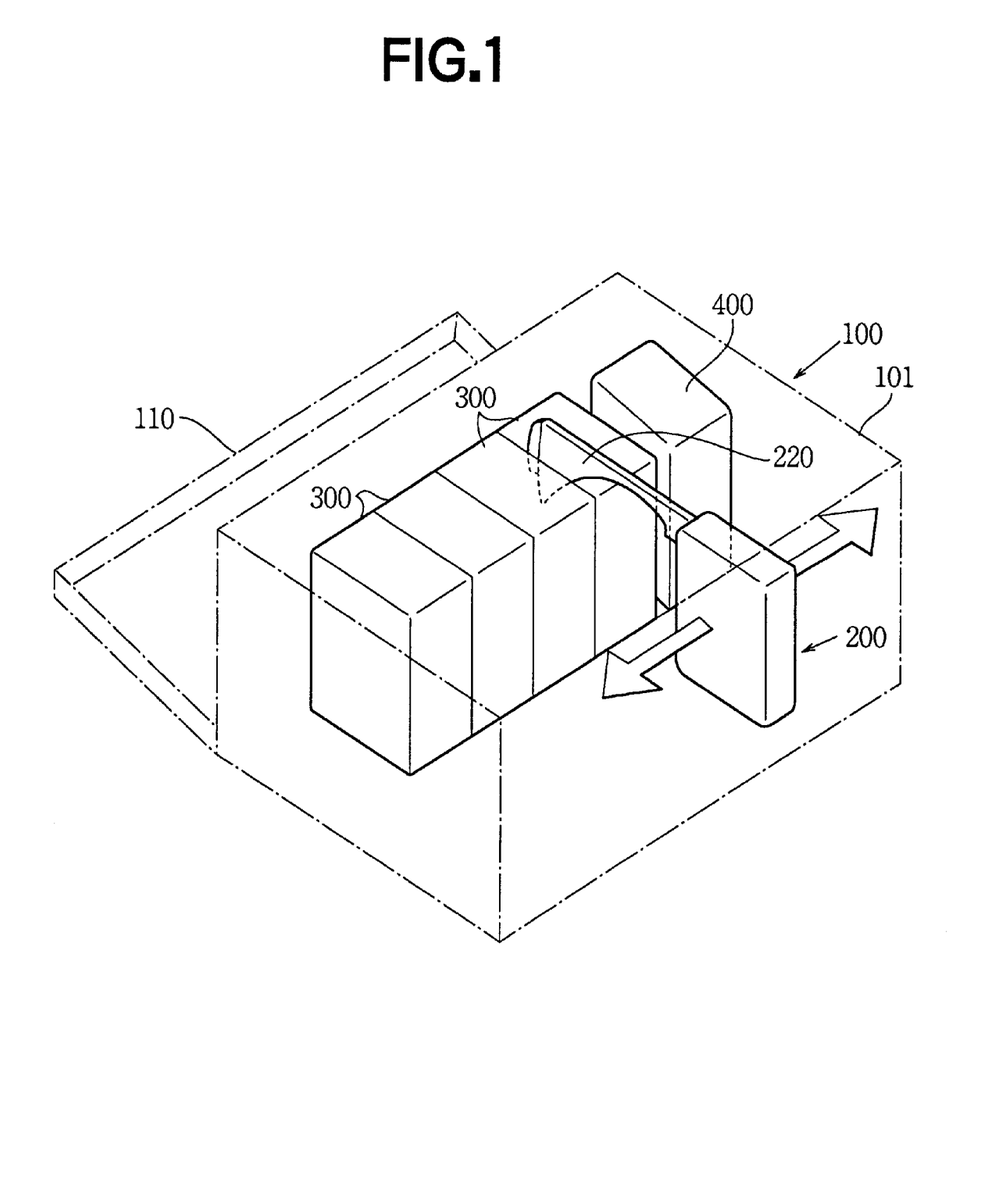
FIG. 1 is a perspective view schematically showing an automatic disc changer system to which the present invention is applied.

Referring to FIG. 1, the automatic disc changer system 100 comprises a casing 101, and a door 110 provided on the front of the casing 101. In the casing 101, a disc reproducing device 200 having a disc loading mechanism, a plurality of disc holders 300, and an auxiliary disc holder 400 are provided. The reproducing device 200 is movably mounted in the casing along the holders 300 disposed in the horizontal direction.

Figure 2:
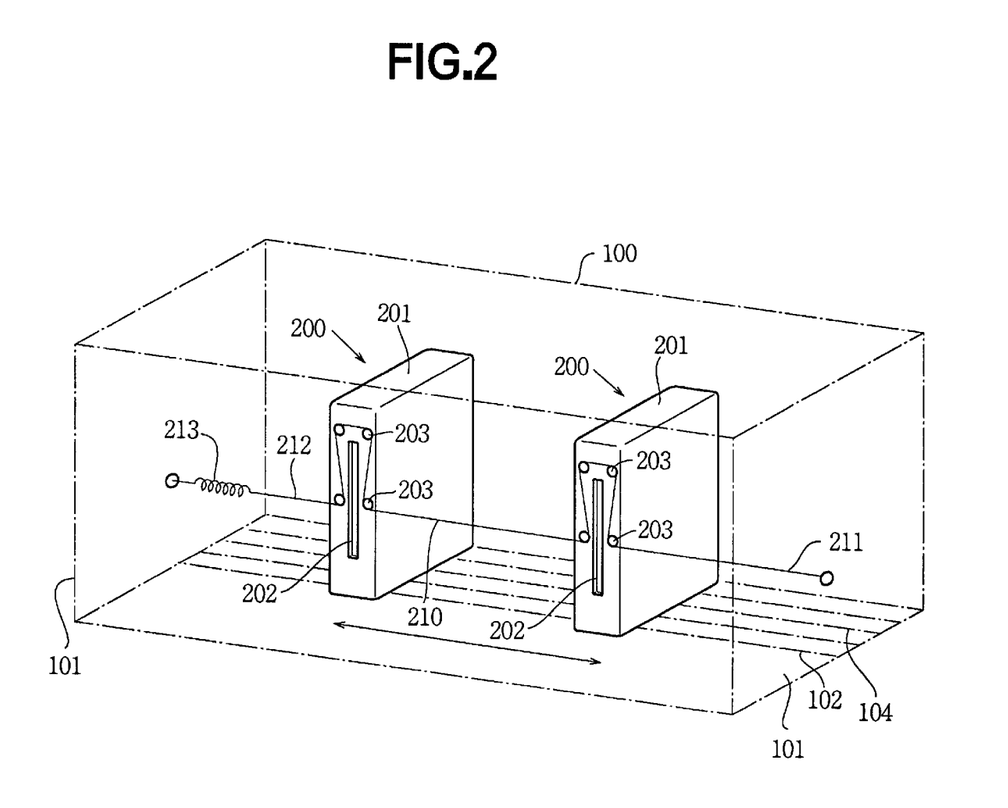
FIG. 2 is a perspective view showing disc reproducing devices of the system.

Referring to FIG. 2, the disc reproducing system has two disc reproducing devices 200 slidably mounted on rails 102 and 104. Each of the disc reproducing devices 200 has a casing 201, a vertical opening 202 formed in a front portion of the casing 201, and four rollers 203 rotatably mounted around the opening 202. A wire 210 is provided between opposite side plates 101 of the casing 100 for preventing a disc stored in the disc holder 300 from being removed from the holder. The wire 210 is engaged with the four rollers 203 of each disc reproducing device 200 in the shape of an inverted U-shape so as to avoid the opening 202. Thus, the reproducing devices 200 can be independently moved along the wire 210 and the rails 102 and 104.

As shown in FIG. 1, the reproducing device 200 has a disc loading arm 220 rotatably mounted in the casing 201 and projected from the opening 202 to the disc holder 300.

Figure 3:
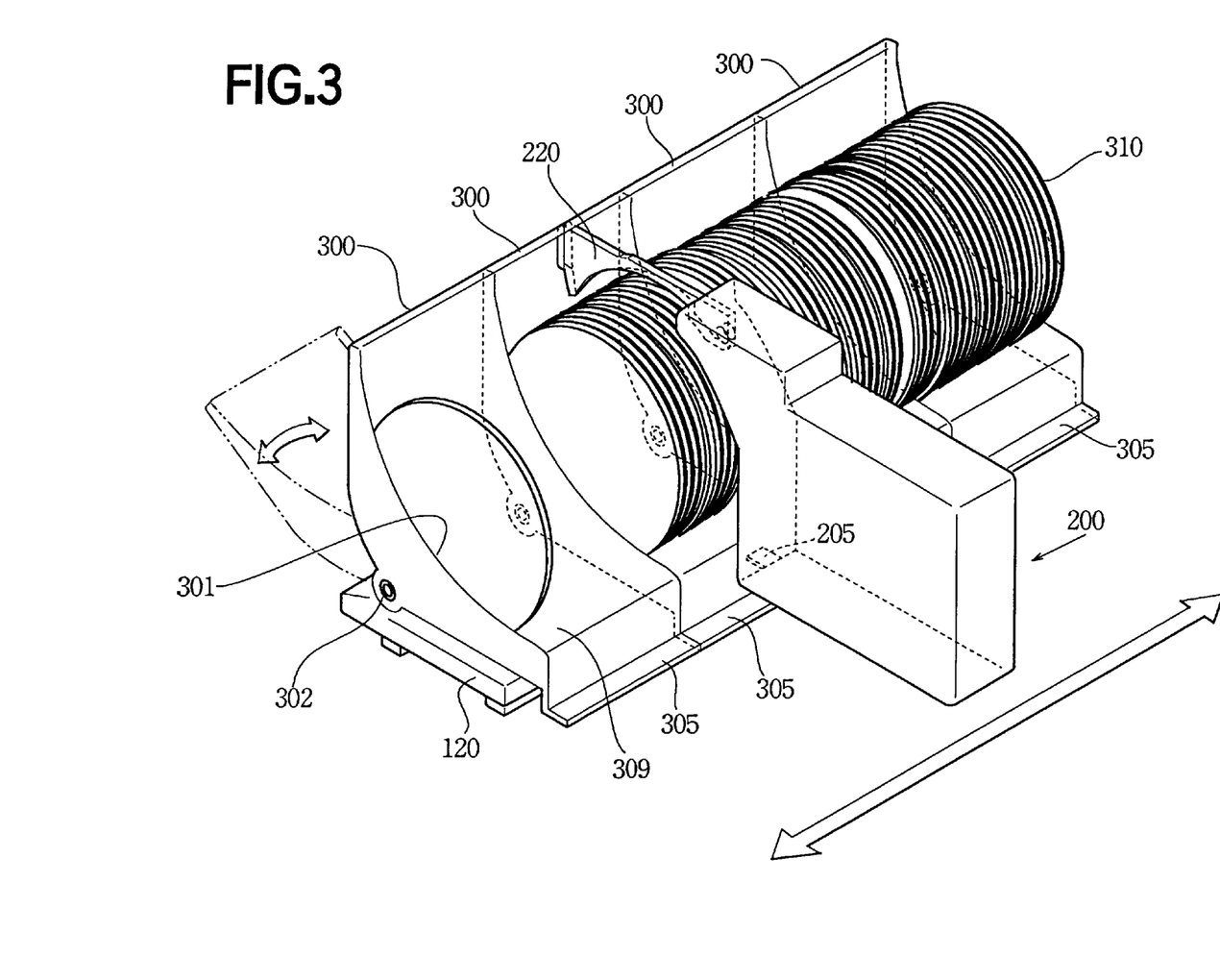
FIG. 3 is a perspective view showing a main part of the system.

Referring to FIG. 3 showing the disc holders 300 in the casing 100, four disc holders 300 are horizontally arranged corresponding to the front portions of the reproducing device 200. A plurality of optical discs 310 are stored in each holder 300 arranged in the horizontal direction. Each of the discs 310 is held in the holder in a vertical disposition so as to be removed from the holder.

Each of the disc holders 300 comprises a base plate 309 having approximately an L-shape in section to be pivotally mounted on a supporting plate 120 provided in the casing 100, and a pair of side plates 301 having a curved periphery. On a lower portion of the holder 300, an engaging plate 305 is provided to be projected to the reproducing device 200. The reproducing device 200 has an engaging lug 205 on a lower portion thereof to be abutted on the engaging plate 305.

Figure 4:
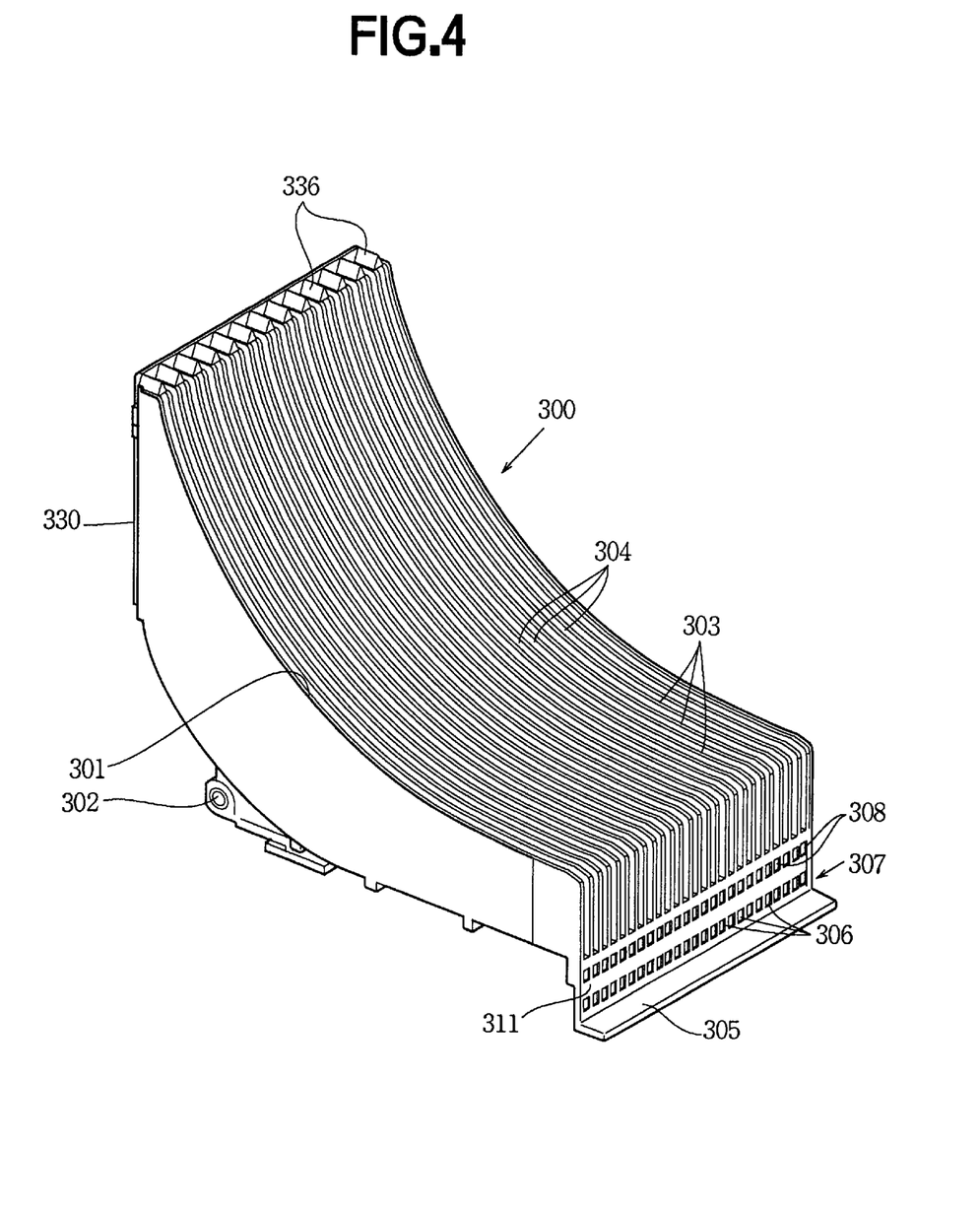
FIG. 4 is a perspective view showing a disc holder.

Referring to FIG. 4, a plurality of holding plates 303 are vertically secured to the base plate between the side plates 301 at a predetermined distance so as to form a space 304 between a pair of holding plates 303 for holding the disc 310.

The disc holder 300 further has a front panel 311 secured to a front end of the base plate to be downwardly projected. A plurality of guide perforations 308 are formed, arranged in the horizontal direction corresponding to the spaces 304. On a lower portion of the perforations 308, an encoder 307 having a plurality of detecting perforations 306 is provided corresponding to the perforations 308.

On the base plate, a movable frame 330 is movably attached. The movable frame 330 comprises a plurality of horizontally arrange guide projections 336 formed on an upper end portion. Each guide projection 336 is in the form of a triangular prism. The guide projections 336 are mounted on the upper ends of the holding plates 303 at every other spaces 304. A bottom side of the triangular prism of the guide projection 336 has a length of one pitch of the space 304 between the holding plates 303 and both edges correspond to the tip ends of the adjacent holding plates 303. Thus, the distance between the apexes of the projections 336 is twice as much as the pitch of tip ends of the holding plate 303.

In order to change the disc in the holder, when the door 110 of the casing 101 is opened, the disc holder 300 can be rotated about the connecting pins 302 to be exposed from the casing. Thus, the disc 310 in the holder 300 can be easily taking out from the casing to be changed.

During the opening of the door 110, the reproducing device 20 is stopped so as not to contact with the holder 300.

On a lower portion of the reproducing device 200, a push rod (not shown) is slidably mounted. When a selected disc 310 is reproduced in the reproducing device 200, the push rod is engaged with a corresponding perforation 308 of the selected disc in the disc holder 300.

When a disc 310 to be reproduced is selected, one of the disc reproducing devices 200 is moved along the wire 210 to the selected disc in the holder 300. The rollers 203 provided on the reproducing device 200 are rotated on the wire 210 which is not circulated, so that the only selected device can be freely moved. Since the wire 210 is horizontally expanded along the disc holders 300, the discs 310 mounted in the holders are prevented from being removed.

The disc is selected in accordance with an address. A position sensor is mounted in the device 200 for detecting an on/off signal by the detecting perforation 306 of the encoder 307. Thus, the position of the selected disc is detected by the device 200.

The loading end of the loading arm 220 is inserted into a space between the projections 336 and into the space 304 between holding plates 303. As hereinbefore described, the width of the entrance gap, that is, the distance between the apexes of the guide projections 336 is twice as much as the pitch of the space 304. Therefore, the arm 220 easily enters the gap between the apexes and engages with the disc. Even if the arm 220 deflects from the center, the end of the arm abuts on one of the slants of the guide projection 336 so that the arm 220 is guided by the slant to the space 304. Thus, the arm can be exactly inserted into the space.

During the reproduction of the disc, since the push rod of the reproducing device 200 is inserted into the perforation 308 of the holder 300 corresponding to the selected disc, and the engaging plate 305 is engaged with the engaging lug 205, the holder 300 is prevented from rotating even if an excessive force is exerted on the holder.

Figure 5:
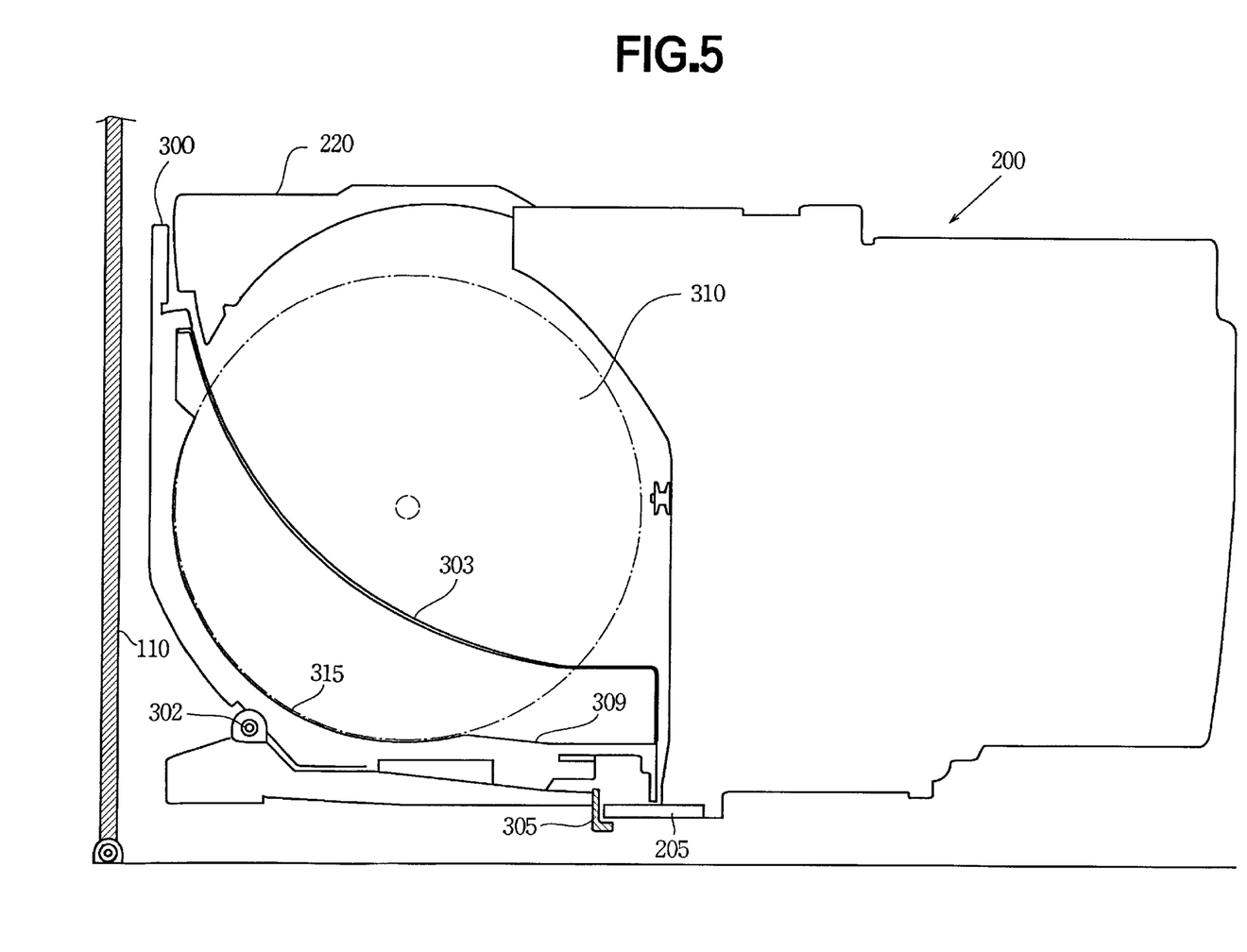
FIG. 5 is a sectional side view showing a main part of the system.

As shown in FIG. 5, the base plate 309 has a disc receiving portion 315 which is formed to be curved corresponding to the periphery of the disc 310.

After the disc 310 is changed, the holder 300 is returned to the original position, and the door 110 is closed. By this operation, the holder 300 may be vibrated to oscillate the discs 310 in the holder. Therefore, the oscillating disc may contact with the front portion of the casing 201 of the reproducing device 200. If the disc contacts with the reproducing device 200 which is moving, the reproducing device 200 or the disc 310 may be damaged.

SUMMARY OF THE INVENTION

An object of the present invention is to provide an automatic disc changer system where a reproducing device is controlled so as to prevent damage of the system.

According to the present invention, there is provided an automatic disc changer for a disc reproducing system having a casing for the automatic disc changer, and a plurality of disc holders arranged in the casing, comprising, the disc holder having a plurality of holding plates forming spaces therebetween for storing a plurality of discs, a reproducing device provided in the casing to be moved along the disc holders, the reproducing device having a loading arm to be inserted into the space for loading the disc on the reproducing device, detector means for detecting vibration of the disc holder and for producing a vibration signal, control means responsive to the vibration signal for stopping the reproducing device for a predetermined time.

The other objects and features of this invention will become understood from the following description with reference to the accompanying drawings.

DETAILED DESCRIPTION OF THE PREFERRED EMBODIMENT

An automatic disc changer system of the present invention is the same as the system of FIGS. 1 to 5 in construction, and the description thereof is omitted. A system for controlling the reproducing device will be described.

Figure 6:
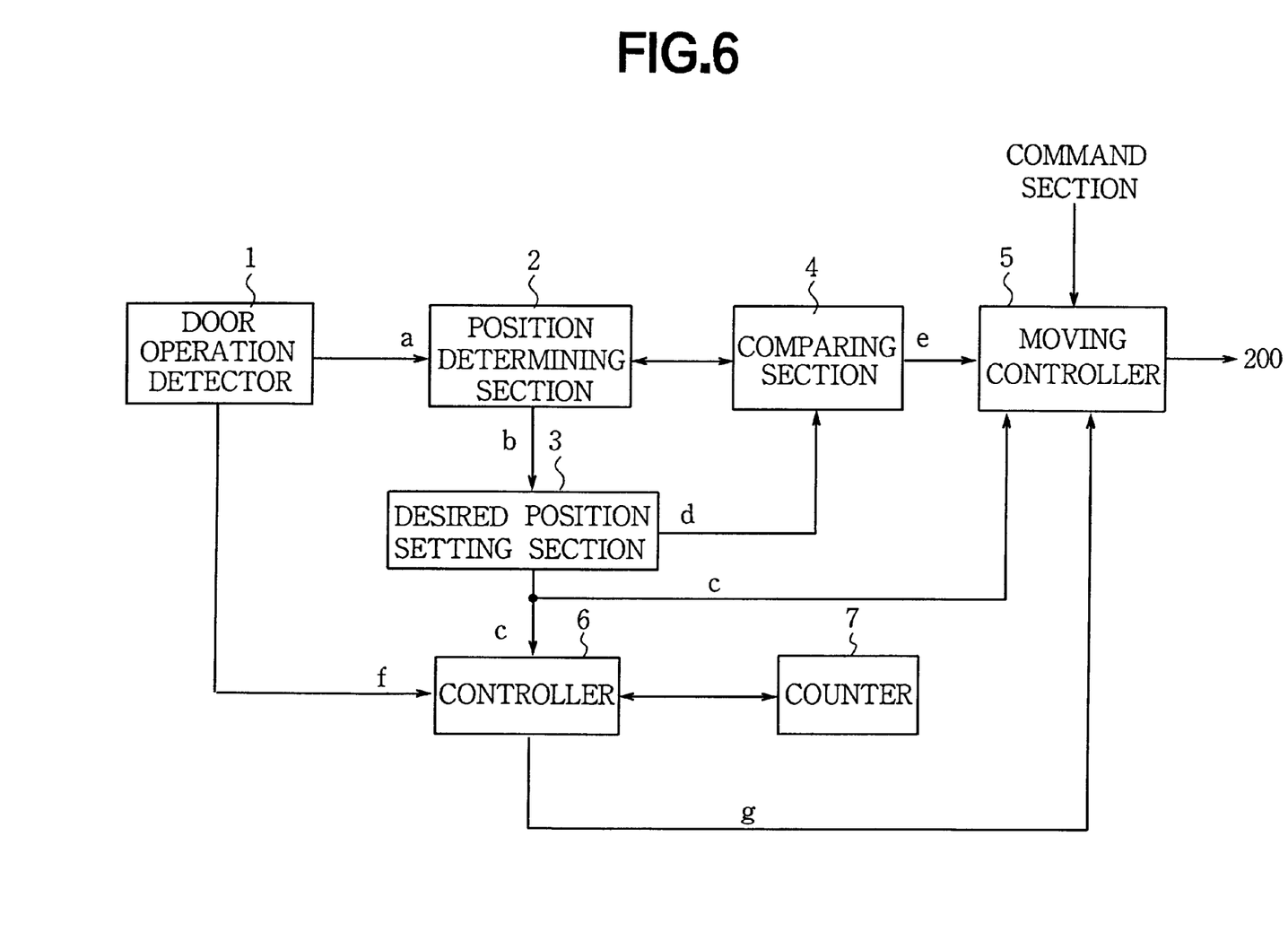
FIG. 6 is a block diagram showing a control system for the reproducing device.

Referring to FIG. 6 showing a control system of the reproducing device 200, the control system comprises a door operation detector 1 for detecting the opening of the door 110 and producing an opening signal a which is applied to a position determining section 2. The position determining section 2 determines a current position of the reproducing device 200 in accordance with the encoder 307 since the reproducing device is stopped when the door is opened and produces a position signal b which is applied to a desired position setting section 3.

The desired position setting section 3 determines whether the reproducing device 200 is stopped at end areas of the holder 300 or not. In the holder 300, twenty-five discs are stored and areas of five discs of both sides of the holder are determined as end areas. When the desired position setting section 3 determines that the reproducing device 200 is not in the end areas of the holder, a moving inhibit signal c is applied to a moving controller 5 and a controller 6. Thus, the reproducing device 200 is controlled by the moving controller 5 to be inhibited from moving.

When the controller 6 is applied with the moving inhibit signal c, a counter 7 is set to a predetermined number.

If the reproducing device 200 is in the end areas, the section 3 sets a desired position of the holder 300. The desired position is set to a central position of the holder. The desired position setting section 3 produces a desired position signal d which is applied to a comparing section 4. The comparing section 4 compares the current position of the reproducing device 200 determined at the position determining section 2 with the desired position and produces a drive signal e which is applied to the moving controller 5. The controller 5 controls to move the reproducing device 200 to the desired position.

The desired position may be any position in the holder except for the end areas thereof.

When the door 110 is closed, the door operation detector 1 produces a close signal f which is applied to the controller 6. The controller 6 determines whether the number of the counter 7 is zero or not. If not, the controller 6 controls to reduce the number by 1. If yes, or the number becomes zero, a moving signal g is applied to the moving controller 5. The reproducing device 200 is moved to a position corresponding to a disc to be reproduced in accordance with a command signal of a command section (not shown).

The operation for controlling the position of the reproducing device 200 will be described with reference to the flowchart of FIG. 7.

In the system, when the door 110 is opened, the reproducing device 200 is stopped.

At a step 701, it is determined whether the reproducing device 200 is stopped at the end areas of the holder or not. If not, the program goes to a step 702 where the reproducing device is inhibited from moving. The program goes to a routing (A), which will be described hereinafter.

If the reproducing device is in the end areas of the holder, the program goes to a step 703 where the desired position is set to the central position of the holder. At a step 704, the current position of the reproducing device 200 is compared with the desired position. If current position>desired position, the program goes to a step 705 where the reproducing device is moved in the left. In the holder 300, the discs 310 are numbered from the left to the right viewed from the door 110. Therefore, if current position>desired position, the program goes to a step 706 where the reproducing device is moved in the right. Thus, the reproducing device is positioned at the desired position. To the contrary, if current position<desired position, the reproducing device is moved to the left and positioned at the desired position.

The program returns to the steps 701 and 702, and the reproducing device is inhibited from moving.

In the system, when the door 110 is opened to change the disc 315 in the holder 300, the reproducing device 200 is stopped at the center of the holder. Consequently, the engaging portion 305 of holder 300 is firmly engaged with the engaging lug 205 of the reproducing device 200, so that the holder is prevented from oscillating.

Figure 7:
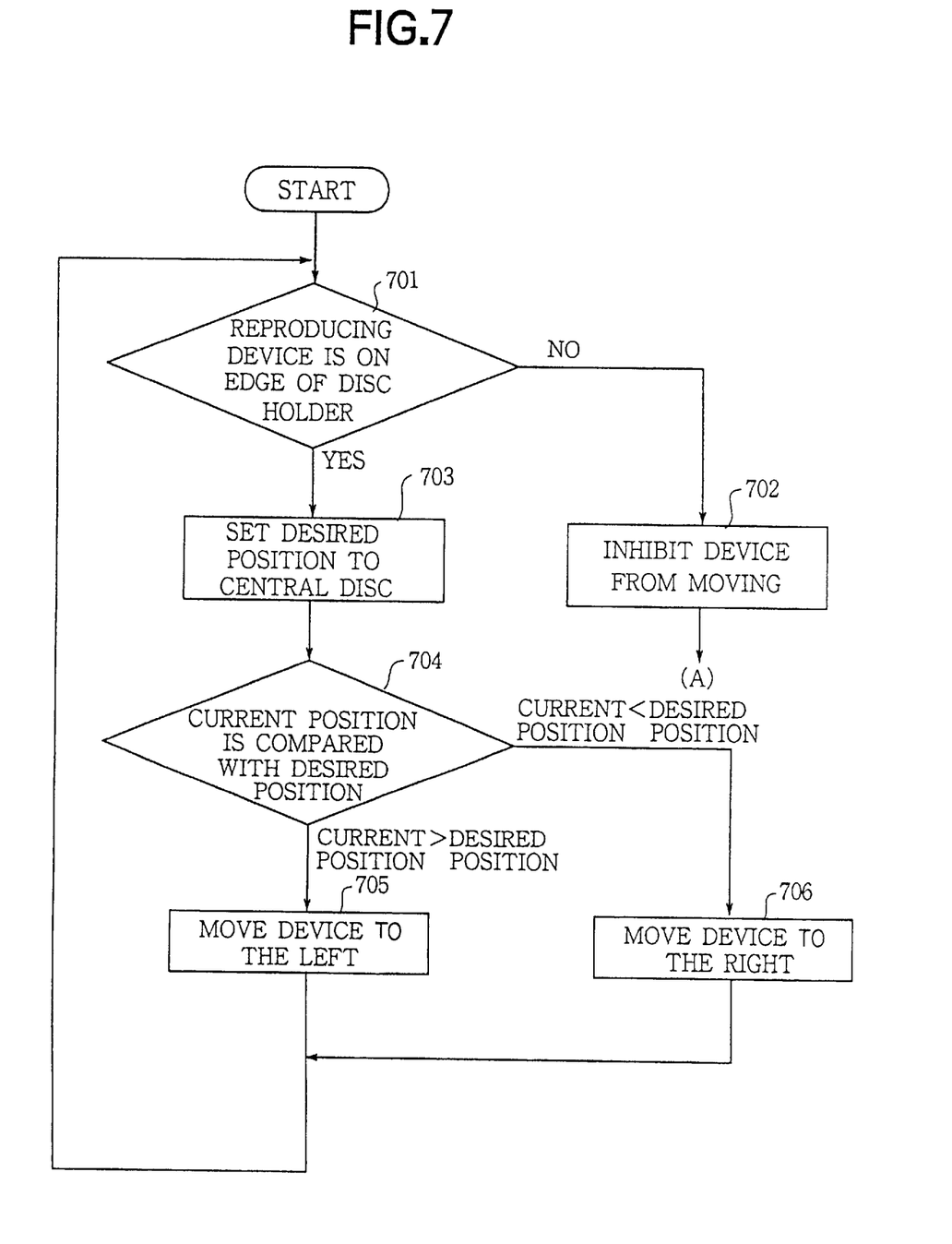
FIG. 7 is a flowchart showing an operation for controlling a position of the reproducing device.
Figure 8:
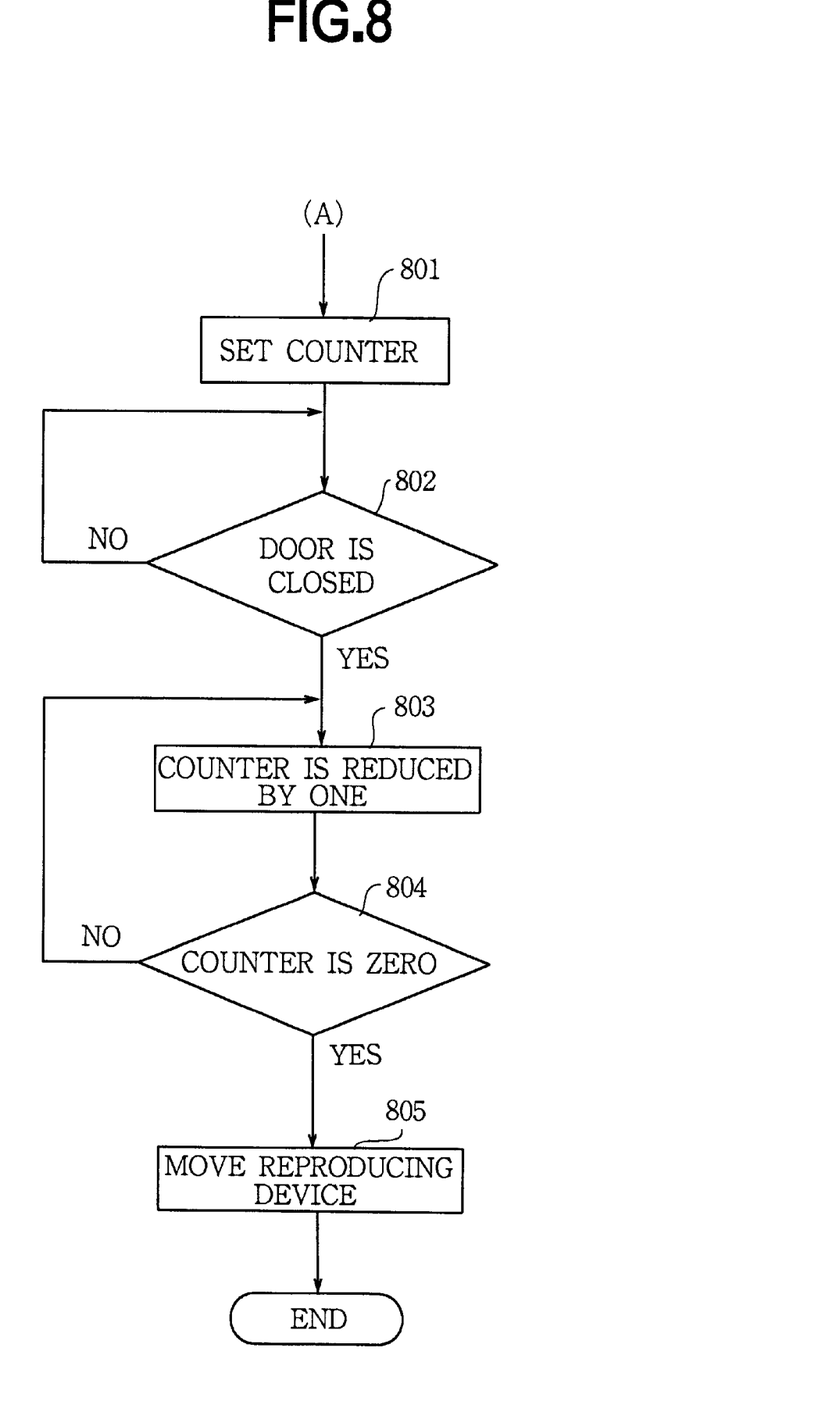
FIG. 8 is a flowchart showing an operation for controlling a moving of the reproducing device.

FIG. 8 shows the operation of the routine (A) of FIG. 7. When the reproducing device 200 is stopped, the counter 7 is set to the predetermined number, for example, thirty. At a step 802, it is determined whether the door 110 is closed or not. If yes, the program goes to a step 803 where the number of the counter 7 is reduced by 1. At a step 804, it is determined whether the counter becomes zero or not. If yes, the reproducing device 200 is controlled to be moved.

A microcomputer takes about 26.7 ms to compute one cycle. It takes about 800 ms to count thirty in the counter 7. Since the oscillation of the disc 310 drops to within 800 ms before the reproducing device 200 starts moving, the disc 310 is prevented from contacting with the reproducing device 200. Thus, damage of the disc and/or reproducing device can be prevented, if the device is moved.

The time of 800 ms is preferably changeable.

If a sensor is provided on the holder to detect that the holder is returned in the original position, the completion of the change of disc is detected by the sensor.

As another embodiment of the present invention, a sensor is provided for detecting a vibration of the holder 300 caused by an earthquake, and the reproducing device 200 is controlled to be stopped when vibration is detected by the sensor.

When the disc 310 is returned to the holder 300 after reproduction, the holder may also be vibrated. Therefore, the reproducing device 200 is stopped for a predetermined time after the returning of the disc.

There may happen that the disc is caught on the way in the holder 300 when returned to the original position after the reproduction thereof. In order to remove the caught disc, it is preferable to slightly move the reproducing device 200 in the lateral direction, or to repeat the returning operation, or to move the reproducing device in the rearward direction and in the forward direction again, or to move the reproducing device to the desired position and to return it to the original position.

Although the computer and the counter are provided for setting a delay time in the above described embodiment, the delay time may be set by using a timer.

In accordance with the present invention, whenever the reproducing device is stopped corresponding to the holder in the disc changer system, the reproducing device is positioned at the center of the holder. Consequently, since the engaging portion of holder is firmly engaged with the engaging lug of the reproducing device, the holder is prevented from rotating.

The reproducing device is controlled to be stopped at a predetermined time before restarting. The vibration of the disc is fallen within the time. Since the disc does not contact with the reproducing device, the damage of the system is avoided.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An automatic disc changer for a disc reproducing system having a casing for the automatic disc changer, comprising:

a disc holder, arranged in the casing, said disc holder having a plurality of holding plates forming a plurality of spaces therebetween for storing a plurality of discs;

a reproducing device movably provided in the casing, the reproducing device having a loading arm to be inserted into one of the plurality of spaces for loading the disc on the reproducing device;

a disc change completion detector for detecting whether disc change is completed;

a controller which starts moving the reproducing device only after a predetermined period of time after the disc change completion detector has detected that disc change is completed has elapsed, said predetermined period of time being changeable;

a door operation detector for detecting opening and closing of a door of the casing;

a position determining section which determines a current position of the reproducing device and produces a position signal; and a desired position setting section, wherein the door operation detector produces an opening signal upon the opening of the door and applies the opening signal to said position determining section which then determines the current position of the reproducing device and produces the position signal which is applied to said desired position setting section.

2. The automatic disc changer according to claim 1, wherein the desired position setting section determines whether the reproducing device is stopped at an end area of the holders.

3. The automatic disc changer according to claim 2, wherein the reproducing device is inhibited from moving if not stopped at an end area of the holders.

4. The automatic disc changer according to claim 2, wherein when the reproducing device is stopped at an end area of the holders, the desired position setting section produces a desired position signal representing a desired position on the holder for the reproducing device to reach.

5. The device of claim 1 wherein the predetermined period of time is changed by the controller based upon an amount of time required for the discs to substantially stop vibrating after a disc change is completed.

6. The device of claim 1 wherein the predetermined period of time is manually changeable by a user.

7. A disc reproducing system having an automatic disc changer comprising a casing, said casing having a door;

a plurality of disc holders arranged in the casing, each disc holder having a plurality of holding plates forming a plurality of spaces therebetween for storing a plurality of discs, each space having an address;

a reproducing device movably provided in the casing, the reproducing device having a loading arm to be inserted into one of the plurality of spaces for loading the disc on the reproducing device; and a reproducing device controller including a disc change completion detector for detecting whether disc change is completed, the reproducing device being controlled such that the reproducing device does not start moving for a predetermined period of time after the disc change completion detector has detected that disc change is completed, said predetermined period of time being changeable, said reproducing device controller including:

a moving controller for controlling movement of the reproducing device, a position determining section which determines a current position of the reproducing device and produces a position signal, a door operation detector for detecting opening and closing of said door of the casing and producing an opening signal and a close signal, a counter controller and counter, a desired position setting section receiving the position signal and determining whether the reproducing device is stopped at an end area of the holders and if not, producing an inhibit signal to said moving controller and to said counter controller, the counter controller setting a number into the counter upon receipt of the inhibit signal, wherein when the desired position setting section determines that the reproducing device is stopped at an end area of the holders, producing desired position signal, a comparing section receiving the desired position signal and the position signal and producing a drive signal which is applied to said moving controller to move the reproducing device to reach the desired position, wherein the door operation detector produces the opening signal upon the opening of the door and applies the opening signal to said position determining section which then determines the current position of the reproducing device and produces the position signal which is applied to said desired position setting section with the desired position setting section producing the inhibit signal to stop the movement of the reproducing device if not in one of the end areas of the holders, and wherein the door operation detector produces the close signal upon closing of the door and applies the closing signal to the counter controller which then determines whether the number of the counter is zero, if not, the counter controller reduces the number by 1, when the number becomes zero, the counter controller applies a moving signal to the moving controller.

8. A disc reproducing system having an automatic disc changer comprising a casing, said casing having a door;

a plurality of disc holders arranged in the casing, each disc holder having a plurality of holding plates forming a plurality of spaces therebetween for storing a plurality of discs, each space having an address;

a reproducing device movably provided in the casing, the reproducing device having a loading arm to be inserted into one of the plurality of spaces for loading the disc on the reproducing device; and a reproducing device controller including a disc change completion detector for detecting whether disc change is completed, the reproducing device being controlled such that the reproducing device does not start moving for a predetermined period of time after the disc change completion detector has detected that disc change is completed, said predetermined period of time being changeable, said reproducing device controller including:

a moving controller for controlling movement of the reproducing device, a position determining section which determines a current position of the reproducing device and produces a position signal, a door operation detector for detecting opening and closing of said door of the casing and producing an opening signal and a close signal, a timer controller and a delay timer, a desired position setting section receiving the position signal and determining whether the reproducing device is stopped at an end area of the holders and if not, producing an inhibit signal to said moving controller and to said timer controller, the counter controller starting the delay timer upon receipt of the inhibit signal, wherein when the desired position setting section determines that the reproducing device is stopped at an end area of the holders, producing desired position signal, a comparing section receiving the desired position signal and the position signal and producing a drive signal which is applied to said moving controller to move the reproducing device to reach the desired position, wherein the door operation detector produces the opening signal upon the opening of the door and applies the opening signal to said position determining section which then determines the current position of the reproducing device and produces the position signal which is applied to said desired position setting section with the desired position setting section producing the inhibit signal to stop the movement of the reproducing device if not in one of the end areas of the holders, and wherein the door operation detector produces the close signal upon closing of the door and applies the closing signal to the timer controller which then determines whether the timer has counted down to zero, when the timer has counted down to zero, the timer controller applies a moving signal to the moving controller.

9. An automatic disc changer for a disc reproducing system having a casing comprising:

a disc holder, arranged in the casing, said disc holder having a plurality of holding plates forming a plurality of spaces therebetween for storing a plurality of discs in a vertical position;

a reproducing device movably provided in the casing so as to be movable in a direction in which the plurality of discs are arranged, the reproducing device having a loading arm to be inserted into one of the plurality of spaces for loading the disc on the reproducing device;

a disc change completion detector for detecting whether disc change is completed; and a controller which starts moving the reproducing device only after a period of time after the disc change completion detector has detected that disc change is completed has elapsed, wherein the period of time is based upon an amount of time required for vibrations of the loaded disc to decrease to assure that a disc does not extend into a path of the reproducing device when the reproducing device starts moving, thereby avoiding interference of the disc and reproducing device.

10. The automatic disc changer of claim 9 wherein the period of time is greater than 800 milliseconds.

11. The automatic disc changer of claim 9 wherein the period of time is changeable.

* * * * *